March 3, 1970  F. W. JONES  3,498,333
PIPE PLUG
Filed Sept. 21, 1967  2 Sheets-Sheet 1
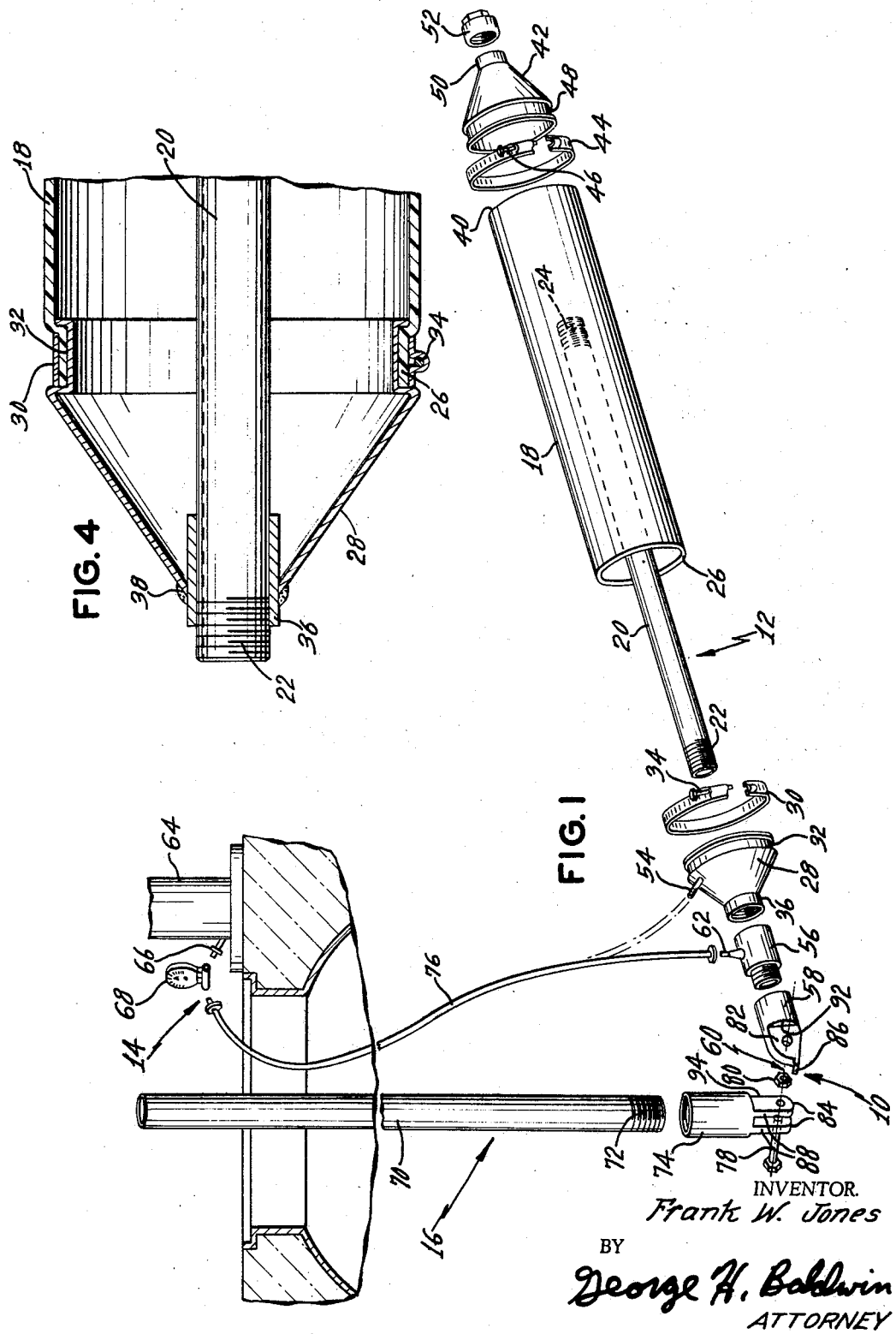
INVENTOR.
Frank W. Jones
BY
George H. Baldwin
ATTORNEY March 3, 1970  F. W. JONES  3,498,333
PIPE PLUG
Filed Sept. 21, 1967  2 Sheets-Sheet 2
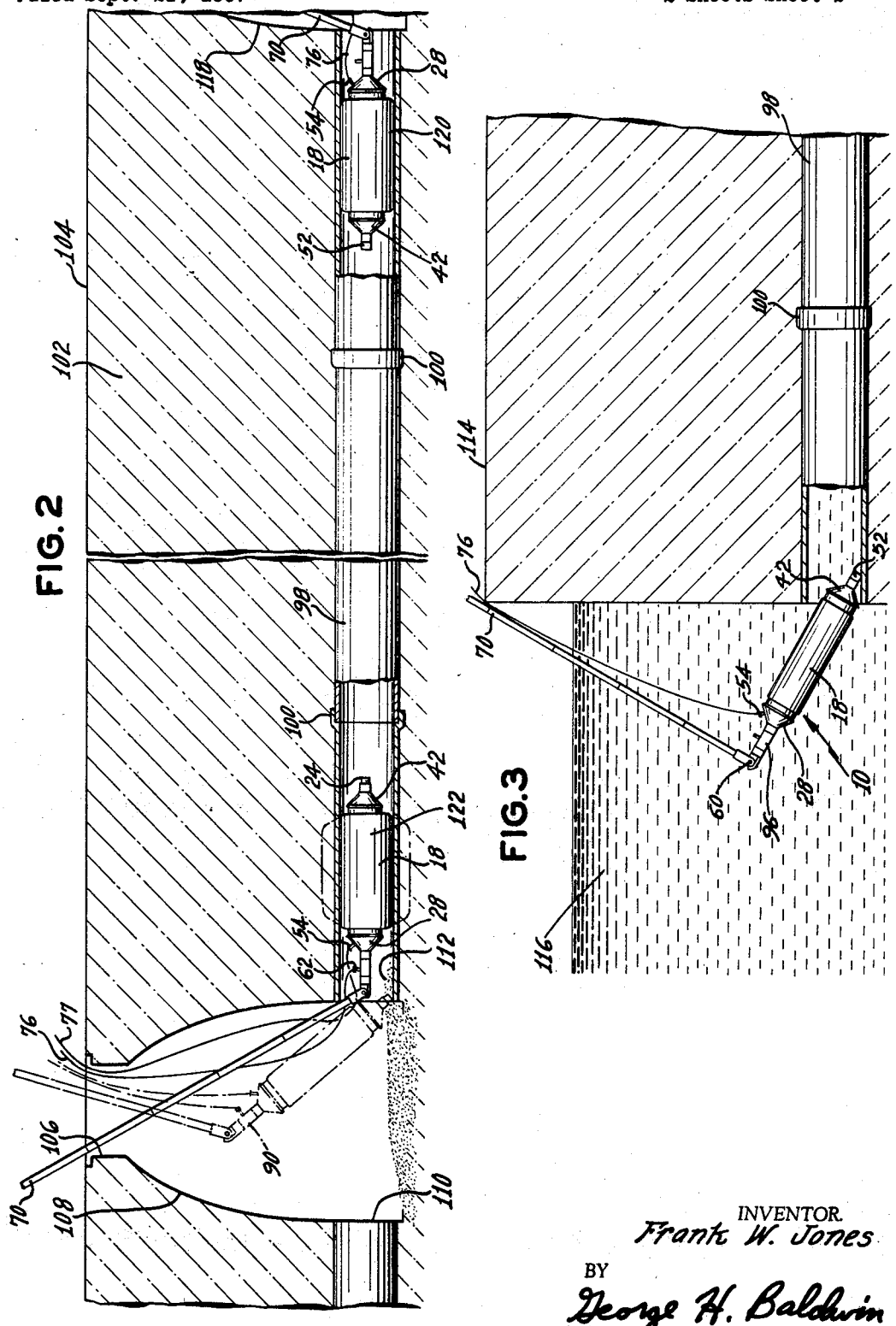
INVENTOR.
Frank W. Jones
BY
George H. Baldwin
ATTORNEY

United States Patent Office 3,498,333
Patented Mar. 3, 1970

---

3,498,333
PIPE PLUG
Frank W. Jones, 642 W. 46th St.,
Jacksonville, Fla. 32208
Filed Sept. 21, 1967, Ser. No. 669,418
Int. Cl. F16l 55/12
U.S. Cl. 138—93   5 Claims

ABSTRACT OF THE DISCLOSURE

A plug assembly for insertion into a sewer pipe to stop the flow therein including an elongated structural member having opposite end portions and selectively operable inflatable sealing member surrounding the structural member for sealing within the sewer pipe. The plug assembly further includes a handle connected to one structural member end portion by a limited and freely pivotal connection to permit angular changes therebetween whereby the sealing member is readily insertable in and positionable in an end of the pipe from the ground surface thereabove. Control means in the form of stop means are operatively associated with the structural member adjacent the pivotal connection for limiting the included angle between the handle and the structural member to less than 180°.

BACKGROUND AND SUMMARY OF THE INVENTION

This invention relates to an improved apparatus for stopping the flow of fluid in a pipe, and more particularly to an expandable temporary plug for use in water, sewer, waste, and disposal pipes, which may also be used in testing such pipes for leaks.

At times, within sewer systems, it becomes necessary to inspect, clean or repair certain portions, sections, or manholes of the waste, disposal, or other-like sewer type system. Certain of these inspections, cleanings or repairs can present difficult problems if there is a fluid flow within the sewer pipes, especially if the flow is quite substantial, unless the flow is completely blocked-off or shut-off before the above enumerated operations are attempted. At other times these operations can prove to be impossible due to the noxious gases forming in the sewer, which gases have on instances killed men entering the sewer systems through the manholes thereof, unless the fluid within the sewer is first completely blocked-off or shut-off, and then the operations are carried out within the sewer system downstream from the place where the flow therein has been shut-off.

While the prior art has provided devices capable of stopping or shutting-off the flow within sewer pipe, many of these devices are lacking in one respect or another. Probably the greatest single downfall of the devices of the prior art is that most of them cannot be easily, readily and conveniently installed and removed from a sewer pipe by an operator who remains on the ground surface thereabove and manipulate the plug through the top of a manhole. Additionally the sewer pipes, particularly adjacent the manhole are often partially filled with sand, dirt and the like making it impossible to install and use the prior art devices without first thoroughly cleaning the ends and portions of the sewer pipe in which these prior art devices are to be installed.

Therefore, it is a general object of this invention to provide a temporary plug which is adapted to be engaged in sealing relationship in the upstream section of a water, waste, disposal or other like sewer pipe to stop the flow therein and permit access for inspection, repair, or cleaning of a manhole portion of the sewer pipe or a section of the sewer pipe downstream from the plug.

Another general object of the invention is to provide a temporary plug for a sewer pipe which is portable and so arranged that it can be readily, conveniently, and manually installed in or removed from a sewer by an operator who remains on the ground surface thereabove and manipulates the device through a manhole.

Still another object of the subject invention is to provide a temporary plug for sewer pipes which is conveniently and readily positionable in the same even if the ends of the pipe are partially filled with sand and which is pneumatically expandable to block the flow in such pipes.

A further object of the instant invention is to provide a temporary plug for sewer pipes which may also be used in testing for leaks in such pipes.

These objects are in general accomplished by providing an inflatable plug assembly for insertion into a sewer pipe to stop the flow therein, which includes an elongated structural member having opposite end portions and an inflatable member which also has opposite end portions surrounding said structural member. Means are provided for respectively sealing the end portions of the inflatable member to the end portions of the structural member, as well as are means for inflating internally of the inflatable member whereby the same becomes sealed within the sewer pipe. A handle having an end portion is provided connected to one end portion of the structural member for manipulating and positioning the inflatable member within the sewer pipe from the ground surface thereabove; and a pivotal connection exists between the handle and the one end portion of the structural member for permitting angular changes between the handle and the structural member such that the plug is readily insertable in and positionable in an end of the sewer pipe.

DESCRIPTION OF THE DRAWINGS

The novel features which are believed to be characteristic of this invention are set forth with particularity in the appended claims. The invention itself, however, both as to its organization and method of operation, may best be understood by reference to the following description taken in connection with the accompanying drawings, in which:

FIG. 1 is a perspective view of the apparatus of this invention, showing the various parts thereof in disassembled form;

FIG. 2 is an elevational view through a section of earth showing the apparatus of this invention in use in a pipe therein;

FIG. 3 is an elevational view through a portion of a body of water and an adjacent bulkhead depicting another use of the apparatus of this invention; and FIG. 4 is an enlarged detailed view, partly in section, of one of the ends of the expandable pipe plug of this invention.

DETAILED DESCRIPTION

With detailed reference to the drawings now, and in particularly to FIGS. 1 and 4 thereof, the improved expandable pipe plug of this invention 10 is seen to include a lower or plug portion 12, an upper or surface portion 14, and an intermediate or connective portion 16 extending between lower portion 12 and upper portion 14.

Lower or plug portion 12 includes a flexible and expandable cylinder or sleeve 18 constructed of rubber or other like material which surrounds a hollow pipe 20 having external threads about its ends 22 and 24. One end 26 of flexible cylinder 18 is secured to a cone shaped member 28 by means of an adjustable clamp 30, see in particular FIG. 4. A groove 32 is provided in cone 28 for securing end 26 of sleeve or cylinder 18 to the cone and to provide a seat for the clamp 30. Clamp 30 is adjustable and tightenable about the sleeve and cone by means of a threaded bolt 34 provided therein. A short nipple 36 having internal threads, is positioned in and through the opening in the smaller end of cone 28 and secured therein by welding or brazing as at 38, see FIG. 4. End 22 of pipe 20 is threaded through nipple 36 to protrude beyond the end of cone 28, as depicted in FIG. 4, to sealingly connect cone 28 with pipe 20. In like manner and fashion the other end 40 of flexible cylinder or sleeve 18 is sealingly attached to the larger end of cone shaped member 42 by means of an adjustable clamp 44 having a threaded bolt 46 for adjusting and tightening the clamp about the sleeve end and cone. A groove 48 is provided in the larger end of cone 42 to afford a seat for clamp 44 such that the cylinder end 40 may be sealingly attached to cone 42. A short nipple 50 having internal threads is positioned in and extends through the opening in the smaller end of cone 42 and is sealingly secured therein by suitable brazing or welding. End 24 of pipe 20 is threaded through nipple 50 to project beyond the smaller end of cone 42 such that a sealed connection exists between end 24 of pipe 20 and cone 42. A threaded cap 52 is provided to sealingly close that portion of the threaded end 24 of pipe 20 which extends beyond nipple 50.

An air valve 54 is provided in and extends through cone member 28 such that pressurized air may be introduced between pipe 20 and cylinder or sleeve 18 to thereby inflate and expand the cylinder to seal the pipe in which the expandable plug portion 12 of this invention is positioned, all of which will be explained more fully hereinbelow. A short piece of pipe or nipple 56 is provided and attached adjacent its larger end to that portion of end 22 of pipe 20 which extends outward beyond nipple 36 within cone 28. The smaller end of short pipe member 56 is threadedly secured to one end of connection or joint member 58 of the connecting joint at 60 between portions 12 and 16 of the apparatus. A second air valve 62 is provided within short pipe member 56 such that pressurized air may be supplied to the interior of pipe member 20 and out its other end 24 when cap 52 is removed therefrom, the purpose and function of which will be explained hereinafter.

The surface or upper portion 14 of the improved apparatus of this invention includes an air source 64 having an air outlet 66. Air source 64 could be an air compressor, a hand air pump as shown here in the preferred embodiment of the invention, or any other suitable source or supply of compressed air. An air pressure indicating gauge 68 is provided to indicate the air pressure within the expandable pipe plug and is attachable to air outlet 66 of the air source 64.

Intermediate or connection portion 16 of the apparatus includes a handle 70 having threads about its lower end 72 for connecting the handle 70 to an upper short connection or joint member 74 of the pivotal joint at 60 between portions 12 and 16 of the apparatus, which member (74) has internal threads about its upper end. Handle 70 can be fabricated in one piece and can be made of various suitable lengths to properly extend from the ground surface down to the depth of the water or sewer pipe in which the expandable plug of this invention is to be used. The handle 70 could also be constructed (as is shown in FIG. 2) to include a plurality of appropriate length sections, such as three or four foot sections, such that the handle could be readily lengthened or shortened by adding or taking away additional sections as the distance varied from the ground surface to the pipe below on which the work was being conducted. This intermediate portion 16 further includes an air supply line or hose 76 extending from the surface to the expandable pipe plug therebelow to connect the air source 64 with air valves 54 or 62, the air line 76 being readily interchangeable between air valves 54 and 62. The upper end of air hose 76 is connected to one side of air pressure gauge 68, or may be connected directly to the air outlet 66 of air source 64 if the pressure gauge 68 is not used.

Lower portion 12 and intermediate or connecting portion 16 are joined together at pivotal joint or connection 60 where joint members 58 and 74 are joined by means of a bolt 78 extending through appropriate openings in these members and a nut 80 completes the joint connection. Joint member 58 is formed with a tongue 82 on one of its ends, which tongue is received between the tine-like members 84 formed on the lower end of joint member 74, such that the tongue 82 can swivel between tines 84 rotating about bolt 78 when the connection at joint 60 is formed. Tongue member 82 is further formed with an ear, lug or stop member 86 which abuts the outer edges 88 of tines 84 when portions 12 and 16 are fully rotated and opened one from the other. Stop member 86 could easily be formed on member 74 and tines 84 could be formed on member 58 if so desired, i.e., by a mere reversal of these parts, the stop mechanism could be re-arranged. When the expandable pipe plug is in this fully opened position the maximum angle between handle 70 and pipe member 20 is approximately 150° and 160°, as depicted in dashed line configuration 90 of FIG. 2. Shoulders such as at 92 are provided on joint member 58 which abut inner edges 94 on tines 84 when the apparatus is in the fully closed position. When the apparatus is in this fully closed position with the inner edges 94 of tines 84 abutting shoulders 92 on the joint member 58 the angle between handle 70 and pipe 20 is approximately 90°, as depicted by configuration 96 in FIG. 3.

The expandable pipe plug 10 of this invention is intended to operate in and block a typical water or waste sewer pipe 98 having joints 100 therealong (see FIG. 2), which is positioned within the earth 102 at various depths below the ground level 104. The system or apparatus is operable from the ground level 104 through the upper opening 106 of a standard manhole 108 whose bottom diameter 110 is normally substantially greater than its diameter at its upper opening 106. The pipe 98 may often carry and have deposited on its bottom surface a substantial amount of sand 112 or like material, which is also generally found on the bottom of manhole 108. The expandable pipe plug is readily inserted into the pipe 98, even if sand 112 is present in the pipe, due to the plug's tapered forward end comprising cap 52 and cone member 42, the plug being easily inserted and worked into the pipe 98 from above by means of handle 70. Additionally, the expandable pipe plug is readily worked into the open end of pipe 98 by means of handle 70 from a position adjacent the top 106 of manhole 108 due to the inner action of lug or stop member 86 against the outer edges 88 of tine members 84, such that the plug cannot be dropped directly vertically downward within the manhole, but that the angle between the plug member and the handle is maintained at an angle of 160° or less whereby the insertion of the plug into the pipe can be readily acomplished. Once the expandable sleeve or cylinder 18 is positioned within pipe 98 the same can be inflated and expanded to block or plug the pipe 98 by inserting air from source 64 through hose 76 and valve 54 between pipe 20 and cylinder 18. When the pipe 98 has been thus plugged, repair or construction can be readily accomplished within the pipe on the downstream side of the plug without interference from water or sewage flowing within the pipe. When repairs or construction have been completed cylinder 18 can be deflated and compressed using valve 54 such that the plug can be readily removed from the pipe. In particular reference to FIG. 3 now, the expandable pipe plug 10 of this invention is adaptable for use over a sea wall or bulkhead 114 adjacent a body of water 116 to prevent reverse or backflow from the body of water 116 into a sewer or disposal pipe such as 98, should the same be inoperative or nonfunctional due to breakage or leakage upstream from the water body 116, while the necessary repairs or additional construction is being effected. In this use of the expandable pipe plug, the same is worked by handle 70 from the top of bulkhead 114 and over the side thereof such as to position the same within the broken flow pipe 98. Once the expandable plug has been placed in position within pipe 98 the same is inflated using air line 76 and valve 54 to seal and plug the flow line 98 thereby preventing further entry of fluid from body of water 116 into pipe 98, such that appropriate repairs and/or construction can be accomplished. When the expandable plug is no longer needed within pipe 98 the same can be deflated and removed therefrom and the sewer or disposal pipe can be returned to normal operating condition.

The improved expandable pipe plug of this invention has still a further use, that being the ability to be also used in testing for leaks in sewer, water, waste, disposal or other like pipes, see particularly FIG. 2. In this use, by employing two of the expandable pipe plugs of this invention, sections of new pipe may be tested for leaks prior to back-filling the ditch or trench in which the pipes are placed; or if desired sections of old pipe between two adjacent manholes such as manhole 108 and adjacent manhole 118 may be tested for leaks. When employed for this use one of the expandable pipe plugs of this invention, as at 120, is positioned within one end of the section of pipe 98 to be tested, and then its flexible sleeve member 18 is inflated and expanded to seal this end of the pipe section by supplying air through hose 76 and valve 54 within cone member 28. Next, a second expandable pipe plug, as at 122, is inserted in the other end of the section of pipe 98 to be tested with cap member 52 having first been removed. Then the plug at 122 is expanded and inflated to seal this end of the section of pipe using air line 76 and valve 54. Now air is supplied to an additional air line 77 (similar to air hose 76) which is connected to air valve 62, such that the air flowing in this line (77) will pass through the center of pipe 20 and out the open end 24, from which cap 52 has previously been removed. In this manner the section of pipe 98 being tested between expandable pipe plugs 128 and 122 may be subjected to an internal build up of air and pressure to check for possible leaks in the pipe 98 and joints 100 theralong. The air pressure build-up, bleed off and leakage within the section of pipe 98 being tested can be checked by means of a suitable air gauge (not shown, but similar to air gauge 68) positioned on the ground surface 104 and connected to air line 77. When the pipe has been properly tested, expandable pipe plugs 120 and 122 can be deflated and removed therefrom and the same put into operation.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. An inflatable plug assembly for insertion into a sewer pipe to stop the flow therein, comprising in combination an elongated structural member having opposite end portions, an inflatable member surrounding said structural member and having opposite end portions, sealing means for respectively sealing said end portions of said inflatable member to said end portions of said structural member, inflating means communicating internally with said inflatable member for inflating same whereby said inflatable member becomes sealed within the sewer pipe, a handle having an end portion connected to one end portion of said structural member spaced from said inflatable member and said sealing means for manipulating and positioning said inflatable member within the sewer pipe from the ground surface, a limited and freely pivotal connection between said handle and said one end portion of said structural member for permitting angular changes between said handle and said structural member whereby said plug is readily insertable in and positionable in an end of the pipe from the ground surface thereabove, and stop means positioned on one said one end portion of said structural member and said end portion of said handle closely adjacent said pivotal connection, said stop means cooperating with the other said one end portion of said structural member and said end portion of said handle for limiting the included angle between said handle and said structural member to less than 180°.

2. The inflatable plug assembly as defined in claim 1 wherein said stop means includes a lug positioned on said one end portion of said structural member closely adjacent said pivot and extending outwardly therefrom and a shoulder positioned on said handle adjacent its lower end, said lug on said structural member cooperating with said shoulder on said handle for limiting the included angle between said structural member and said handle to less than 180° and generally greater than 90°.

3. A plug assembly for insertion into an underground sewer pipe to stop the flow therein comprising an elongated structural member having opposite end portions, a selectively operable sealing member surrounding said structural member for sealing within the sewer pipe, a handle having an end portion connected to one end portion of said structural member for manipulating and positioning said sealing member within the sewer pipe from the ground surface, a limited and freely pivotal connection between said handle and said one end portion of said structural member for permitting angular changes between said handle and said structural member whereby said sealing member is readily insertable in and positionable in an end of the sewer pipe from the ground surface thereabove, control means located between said structural member and said handle for limiting the included angle between said structural member and said handle to less than 180°.

4. The plug assembly as defined in claim 3 wherein said control means includes stop means positioned on said one end portion of said structural member and said end portion of said handle closely adjacent said pivotal connection, said stop means cooperating with the other of said one end portion of said structural member and said end portion of said handle thereby limiting the included angle therebetween to less than 180°.

5. The plug assembly as defined in claim 4 wherein said stop means includes a lug positioned on said one structural member end portion and a shoulder positioned on said handle end portion, said maximum included angle between said handle and structural member being limited by contact of said lug and shoulder to be less than 180°.

References Cited

UNITED STATES PATENTS

| 1,510,212 | 9/1924 | Du Bois | 138—93 |
| 2,130,030 | 9/1938 | Richardson | 138—93 |
| 2,474,047 | 6/1949 | Gorzkowski | 138—93 |
| 2,927,609 | 3/1960 | Vander Lans | 138—94 |
| 1,506,418 | 8/1924 | Evensta | 138—93 X |
| 3,173,449 | 3/1965 | Custer | 138—93 |

FOREIGN PATENTS

| 663,434 | 5/1963 | Canada. |
| 201,377 | 2/1939 | Switzerland. |

HERBERT F. ROSS, Primary Examiner

U.S. Cl. X.R.

138—94.5